Figure 1:
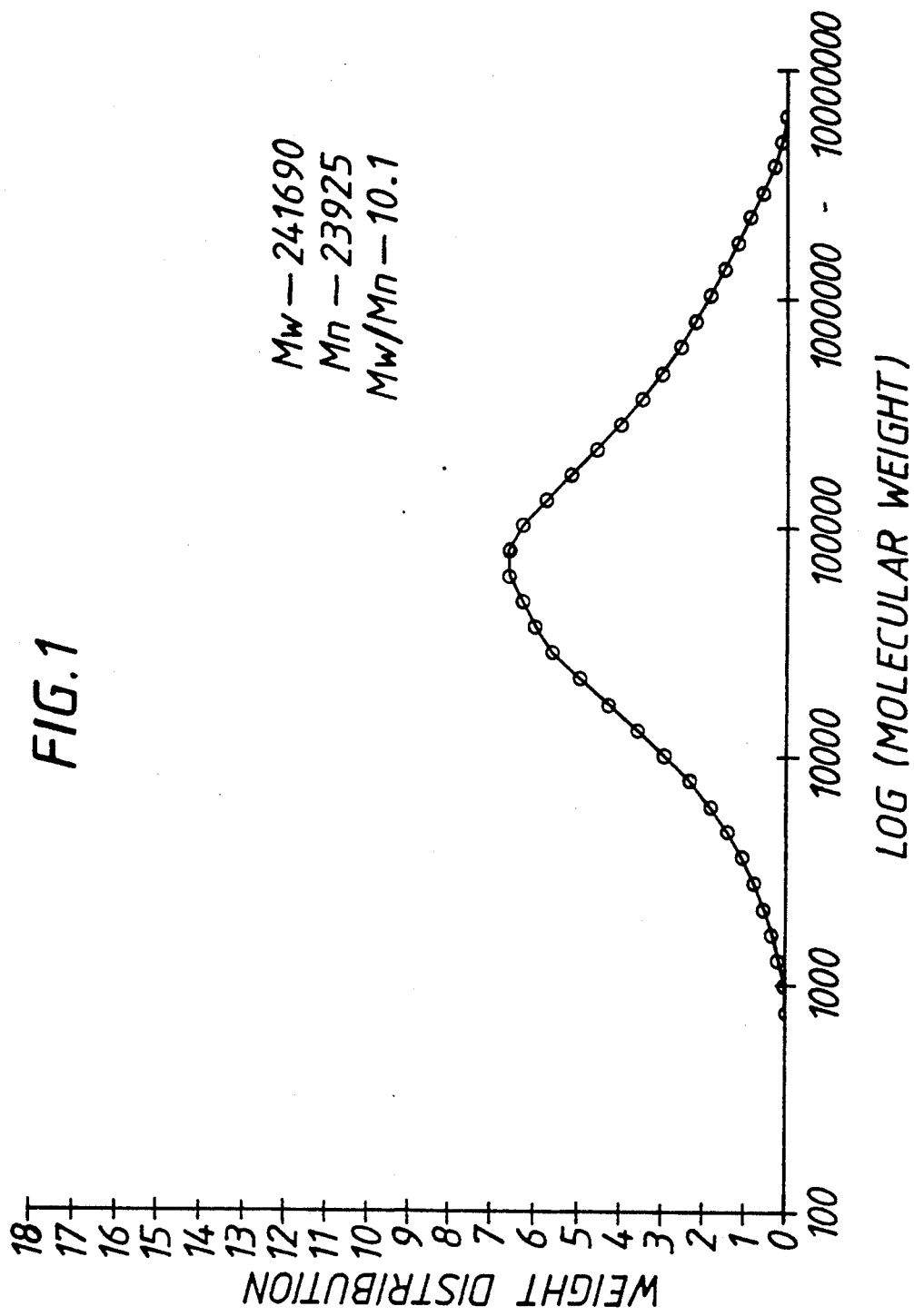

United States Patent

Dawkins

[11] Patent Number: 5,169,817
[45] Date of Patent: Dec. 8, 1992

[54] CHROMIUM-CONTAINING COMPLEX POLYMERIZATION CATALYST

[75] Inventor: Gordon M. Dawkins, Beuvry, France

[73] Assignee: BP Chemicals Limited, London, England

[21] Appl. No.: 574,643

[22] Filed: Aug. 29, 1990

[30] Foreign Application Priority Data

Sep. 4, 1989 [GB] United Kingdom ............... 8919926

[51] Int. Cl.$^5$ ............................................ C08F 4/69
[52] U.S. Cl. ................................... 502/152; 502/117; 526/129; 526/170
[58] Field of Search ................................ 502/117, 152

[56] References Cited

U.S. PATENT DOCUMENTS

| | | | |
|---|---|---|---|
| 3,687,920 | 1/1971 | Johnson. | |
| 3,806,500 | 4/1974 | Karol | 502/152 X |
| 3,844,975 | 10/1974 | Karol | 502/117 X |
| 3,879,368 | 4/1975 | Johnson | 502/117 X |
| 4,077,904 | 3/1978 | Noshay et al. | 502/152 |
| 4,086,408 | 4/1978 | Karol et al. | 502/152 X |
| 4,086,409 | 4/1978 | Karol et al. | 502/152 X |
| 4,153,576 | 5/1979 | Karol et al. | 502/152 |

FOREIGN PATENT DOCUMENTS

| | | |
|---|---|---|
| 0003836 | 9/1979 | European Pat. Off. . |
| 0255296 | 2/1988 | European Pat. Off. . |
| 2113965 | 10/1971 | Fed. Rep. of Germany . |
| 2193838 | 2/1974 | France . |
| 1253063 | 11/1971 | United Kingdom . |

Primary Examiner—Patrick P. Garvin
Attorney, Agent, or Firm—Brooks Haidt Haffner & Delahunty

[57] ABSTRACT

The present invention relates to an olefin polymerization obtainable by depositing on a dry inorganic oxide support at least one mononuclear chromium complex, which is representable by the general formula:

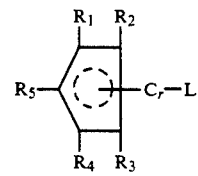

wherein:
the cyclopentadienyl ligand is substituted with 4 or 5 hydrocarbyl groups ($R_1$–$R_5$) containing 1 to 3 carbon atoms, and
L is one or more hydrocarbyl ligands which are sufficiently reactive to enable the complex to react with the inorganic oxide without thermal activation.

The catalyst can be used without thermal activation for polymerizing olefins, particulary ethylene optionally with $C_{3-8}$ alpha-olefins. It produces polyolefins having broad molecular weight distribution.

12 Claims, 2 Drawing Sheets

CHROMIUM-CONTAINING COMPLEX POLYMERIZATION CATALYST

The present invention relates to an olefin polymerisation catalyst, a process for producing polyolefins using the catalyst and polymers obtainable therefrom.

The use of mononuclear chromium complexes for the polymerisation of olefins is known. For example, British Patent Specification 1253063 discloses a process for the polymerisation of ethylene comprising contacting ethylene, optionally in the presence of hydrogen, with a catalytic amount of bis(cyclopentadienyl) chromium (II) adsorbed on an inorganic oxide at a temperature and pressure sufficient to initiate the polymerisation reaction. U.S. Pat. No. 3,806,500 discloses a process for polymerising ethylene with a catalyst comprising a pi-bonded chromium compound (e.g. bis(cyclopentadienyl) chromium (II)) deposited on an activated support which catalyst is thermally aged before contacting with the ethylene by heating at a temperature of about 135° to 900° C. in an inert atmosphere for a period of time sufficient to allow for the removal of at least some of the ligands from the chromium compound. U.S. Pat. No. 3,844,975 discloses the homopolymerisation of ethylene or the copolymerisation of ethylene with other alpha-olefins using as a catalyst cyclopentadienyl chromium tricarbonyl hydride supported on an activated silica and/or alumina support, the catalyst being thermally aged in an inert atmosphere prior to contact with the monomer(s). In each of the patents it is suggested that the catalyst can comprise a substituted cyclopentadienyl ligand. However, none of the patents contains a specific example which utilises a compound containing a substituted cyclopentadienyl ligand.

Polymers produced using monochromium catalysts having unsubstituted cyclopentadienyl ligands, e.g. bis(cyclopentadienyl) chromium (II), generally have a relatively low molecular weight, a narrow molecular weight distribution (Mw/Mn), and a low melt index ratio.

It has now been found that certain mononuclear chromium complexes having a substituted cyclopentadienyl ligand, when supported on inorganic oxide, can be used as a catalyst for the polymerization of olefins, particularly the homopolymerization of ethylene and the copolymerization of ethylene with one or more $C_3$ to $C_8$ alpha-olefins. Unexpectedly, the supported catalyst can be used to produce polymers having relatively broad molecular weight distributions, which can be asymmetric, e.g. with a high molecular weight tail. Also, the molecular weight of the polymer can be partially controlled during the polymerization process by using hydrogen. It is known that hydrogen generally acts during the polymerization as a chain-transfer agent reducing the molecular weight of the polymer produced. However, when the molecular weight of the polymer is reduced by the effect of hydrogen in the presence of the catalyst of the present invention, it has been surprisingly discovered that the molecular weight distribution of the polymer can be maintained substantially constant at a relatively high value, or may be is broadened. Furthermore, the catalyst can have a relatively high activity without the need for thermal activation of the supported mononuclear chromium complex. The catalyst can therefore be used to produce polymers having a broad molecular weight distribution with a relatively high molecular weight which polymers generally have good extrusion properties in that they have relatively low viscosities at high shear rates. They may also have relatively high stress crack resistance. Such polymers are consequently particularly suitable for applications such as the production of blow moulded articles, pipe and tough film. In particular, the catalyst according to the present invention can be used to produce high density polyethylene having a molecular weight distribution in the range 5 to 20, preferably in the range 8 to 18.

Moreover, it can be used for polymerizing or copolymerizing ethylene in the presence of increased amounts of hydrogen to produce polymers or copolymers of ethylene having reduced molecular weight, e.g. Mw in the range $5 \times 10^4$ to $5 \times 10^5$, with a broad molecular weight distribution, maintained at a high value, e.g. Mw/Mn in the range 5 to 18.

According to the present invention an olefin polymerisation catalyst obtainable by depositing on a dry inorganic oxide support a mononuclear chromium complex and preferably so obtained, is characterised in that the mononuclear chromium complex is representable by the general formula:

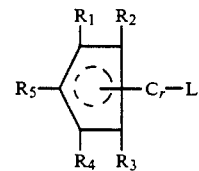

wherein
four of the groups $R_1$ to $R_5$ of the substituted cyclopentadienyl ligand are individually selected from the group consisting of methyl, ethyl, isopropyl and n-propyl and the fifth is selected from the group consisting of methyl, ethyl, n-propyl, isopropyl and hydrogen and L is one or more hydrocarbyl ligands (depending on the coordination sites available on the chromium) which ligands are sufficiently reactive to enable the complex to react with the inorganic oxide without thermal activation.

The mononuclear chromium complex preferably comprises a cyclopentadienyl ligand substituted with the five groups $R_1$ to $R_5$ selected from the group consisting of methyl, ethyl, isopropyl and n-propyl. The number of hydrocarbyl ligands L in the chromium complex preferably is 1 or 2, depending on the valency of chromium in the complex.

The mononuclear chromium complex must comprise at least one hydrocarbyl ligand, L, which is sufficiently reactive to enable the complex to react with the inorganic oxide without thermal activation. Particularly, the complex is able to react with the inorganic oxide at a temperature lower than 100° C. and higher than about −30° C., preferably at a temperature from −20° C. to 50° C., e.g. at ambient temperature (20° C.), in an inert atmosphere. More particularly, the complex comprising such a hydrocarbyl ligand L may be capable of reacting with the hydroxyl groups existing in the inorganic oxide under these conditions. Preferably the hydrocarbyl ligand L is a labile group. Suitable reactive hydrocarbyl ligands L preferably include ligands which are sufficiently labile to enable the complex to react with the hydroxyl groups of the inorganic oxide, at a temperature higher than about −30° C., but lower than 100° C., preferably at a temperature from −20° C. to 50° C. If the complex comprising such a hydrocarbyl ligand L are not sufficiently labile or reactive with the inorganic oxide, the catalyst thus obtained without thermal activation has a very low activity in olefin polymerisation, and thermal activation will then be needed.

More particularly, a suitable reactive hydrocarbyl ligand L may be a hydrocarbyl ligand obtained by removal of H from LH which is a unsaturated hydrocarbon of 3 to 6 carbon atoms, or a substituted derivative thereof with one to three alkyl groups of 1 to 3 carbon atoms. The unsaturated hydrocarbon LH may be a conjugated or a non-conjugated diene hydrocarbon, such as pentadiene-1,3 or pentadiene-1,4. Preferably LH is a unsaturated hydrocarbon of 3 or 5 carbon atoms.

Suitable reactive hydrocarbyl ligands include, for example:
(a) cyclopentadienyl
(b) cyclopentadienyl substituted with one or two groups individually selected from methyl, ethyl, isopropyl and n-propyl
(c) pentadienyl
(d) pentadienyl substituted with hydrocarbyl groups containing e.g. from 1 to 6 carbon atoms, preferably substituted with up to three groups individually selected from methyl ethyl and n-propyl such as 2,4-dimethyl pentadienyl and 2-methylpentadienyl and
(e) allyl
(f) allyl substituted with hydrocarbyl groups containing e.g. from 1 to 6 carbon atoms, preferably substituted with up to three groups individually selected from methyl, ethyl, isopropyl and n-propyl.

The preferred reactive hydrocarbyl ligands L are: cyclopentadienyl, allyl, pentadienyl, 2,4-dimethyl-pentadienyl and 2-methyl-pentadienyl.

Mononuclear chromium complexes suitable for use in the present invention are known and can be prepared by known methods. Any novel complexes embraced by the above mentioned general formula can be prepared by methods analogous to known methods.

In situ preparation of the catalyst in which the mononuclear chromium complex is formed in solution and deposited directly onto the inorganic oxide support advantageously reduces the number of process steps required to prepare the catalyst.

Any suitable inorganic oxide can be used to support the mononuclear chromium complex including, for example, silica, alumina, silica-alumina mixtures, thoria, zirconia, magnesia, titania and mixtures thereof. Preferably, the inorganic oxide comprises a major amount of silica. More preferably, the inorganic oxide comprises at least 80% by weight of silica.

The particle size of the inorganic oxide support is not considered to be particularly critical, but the inorganic oxide preferably has a relatively high surface area. The surface area of the inorganic oxide is preferably greater than 20 m²g⁻¹, more preferably from 50 to 1000 m²g⁻¹.

The mononuclear chromium complexes are sensitive to moisture and so the inorganic oxide used to support the complex should be dry. The inorganic oxide can be dried simply by heating the oxide in a dry, inert atmosphere. The drying may be carried out at any temperature up to the temperature at which the oxide begins to sinter for a period of time which is at least sufficient to remove the physically adsorbed water. Typically, the drying may be carried out at a temperature of from 200° to 1000° C. for a period of from 6 to 36 hours. Preferably, the temperature used is at least 300° C., more preferably at least 500° C., but is preferably less than 900° C. A suitable inert atmosphere can be provided, for example by carrying out the heating under a blanket of an inert gas such as nitrogen or argon. Preferably, the inert gas is passed through the inorganic oxide during the drying to assist in displacing the water.

The melt index of the polymer produced using the supported catalyst may be affected by the selection of the type and grade of inorganic oxide. The temperature at which the inorganic oxide is dried may have an effect on the relative productivity of the catalyst system and on the molecular weight distribution and melt index of the polymer produced.

The mononuclear chromium complex may be deposited on the dry inorganic oxide using known techniques for the preparation of supported catalysts. For example, a slurry technique can be used in which the inorganic oxide is contacted with a solution of the complex under conditions which exclude air and water. The slurry can be stirred for a period of time sufficient to achieve good adsorption of the mononuclear chromium complex on the inorganic oxide support e.g. up to about 4 hours. Any suitable dry solvent may be used such as for example petroleum ether.

The supported catalyst may be used in the form of a slurry or paste. However, the solvent is preferably removed, e.g. by filtration or evaporation in a dry, inert atmosphere to produce a dry free-flowing powder.

Direct vapour deposition may also be used in some cases to deposit the mononuclear chromium complex on the inorganic oxide. This may conveniently be carried out by blending the complex and the inorganic oxide in a dry, inert atmosphere and then reducing the pressure to cause the mononuclear chromium complex to sublime and adsorb onto the inorganic oxide support.

Typically, the amount of the mononuclear chromium complex deposited on the inorganic oxide support is such that the amount of chromium is from 0.01 to 10% by weight of the total weight of the complex and inorganic oxide. Preferably, the supported catalyst contains from 0.1 to 5% more preferably from 1 to 3% by weight of chromium. Mixtures of the mononuclear chromium complexes can be deposited simultaneously or sequentially onto the inorganic oxide support.

It is an advantageous feature of the catalysts according to the present invention that they need not be thermally activated before use.

A thermal activation is generally considered as an expensive stage and as a source of irreproducibility of the catalyst. Therefore, the omission of a thermal activation advantageously leads to a highly reproducible catalyst. The non-thermally-activated catalyst shows other advantages: it is more active in olefin polymerisation and the polymer produced has a much lower molecular weight. Furthermore, the molecular weight distribution of the polymer obtained is broadened when the molecular weight of the said polymer is decreased by using increased amounts of hydrogen during polymerization. However, the catalysts may be thermally activated before use in a polymerisation reaction. The thermal activation can comprise heating the supported catalyst at a temperature of preferably less than 700° C. for a period of at least 5 mins, preferably 10 mins to 24 hours. Preferably, the activation is carried out at a temperature of from 100° to 350° C. The thermal activation should be carried out in a dry, inert atmosphere, more particularly in a non-oxidizing atmosphere, free from moisture and oxygen, e.g. under nitrogen, argon or vacuum. The catalyst thus activated has a chromium content substantially similar to that of the unactivated catalyst.

The present invention includes a process for the production of polyolefins, in particular homopolymers of ethylene and copolymers of ethylene with minor amounts of at least one $C_3$ to $C_8$ alpha-olefin, which process comprises contacting the monomer or monomers, optionally in the presence of hydrogen, with an olefin polymerisation catalyst according to the present invention and as hereinbefore defined at a temperature and pressure sufficient to initiate the polymerisation reaction. The polymers or copolymers of ethylene thus obtained generally have a high density, from 950 to 970 kg/m3, and the $C_3$ to $C_8$ alpha-olefin content in the copolymers of ethylene can be about from 0.01% to 5% by weight.

The supported olefin polymerisation catalysts according to the present invention may optionally be used in the presence of one or more organo metallic co-catalyst compounds having a metal belonging to the Groups I to III of the Periodic Table of the elements, the metal being selected e.g. amongst lithium, aluminium, zinc, magnesium and boron. Such co-catalysts are known for use in the polymerisation of olefins and particularly includeorgano-aluminium compounds, for example, trimethylaluminium, triethylaluminium, diethylaluminium hydride, triisobutyl aluminium, tridecylaluminium, tridodecylaluminium, diethylaluminium methoxide, diethylaluminium ethoxide, diethylaluminium phenoxide, diethyl aluminium chloride, ethyl aluminium dichloride and methyl diethoxy aluminium. The co-catalyst can be deposited on the supported catalyst before, during or after the addition of the mononuclear chromium complex or can be added to the polymerisation medium along with the catalyst. Preferably the amount of co-catalyst used is up to 1000 mols of metal per mol of chromium in the mononuclear chromium complex of the supported catalyst. More preferably the amount of co-catalyst used in less than 100 most preferably less than 10 mols of metal per mol of chromium.

The olefin polymerisation catalyst according to the present invention can be used to produce polymers using solution polymerisation, slurry polymerisation or gas phase polymerisation techniques. Methods and apparatus for effecting such polymerisation reactions are well known. The catalyst according to the present invention can be used in similar amounts and under similar conditions to known olefin polymerisation catalysts such as for example the chromocene catalysts or supported chromium oxide catalysts.

The polymerisation is effected by contacting the monomer(s) with a catalytically effective amount of the olefin polymerisation catalyst according to the present invention, in the substantial absence of catalyst poisons, optionally in the presence of hydrogen at a temperature and pressure which are sufficient to initiate polymerisation. The amount of hydrogen may be such that the ratio of the partial pressures of hydrogen to olefin(s) is from $10^{-3}$ to 1, preferably from $10^{-2}$ to $10^{-1}$.

Typically, the temperature is from 30° to 110° C. for the conventional slurry or "particle form" process and the gas phase process. For the solution process the temperature is typically from 100° to 200° C. The pressure used can be selected from a relatively wide range of suitable pressures e.g. from subatmospheric to about 350 MPa (50,000 psi). Generally, the pressure is from atmospheric up to about 6.9 MPa, preferably from 0.14 to 5.5 MPa.

The invention also includes polymers obtainable by a process using a catalyst according to the present invention.

Figure 2:
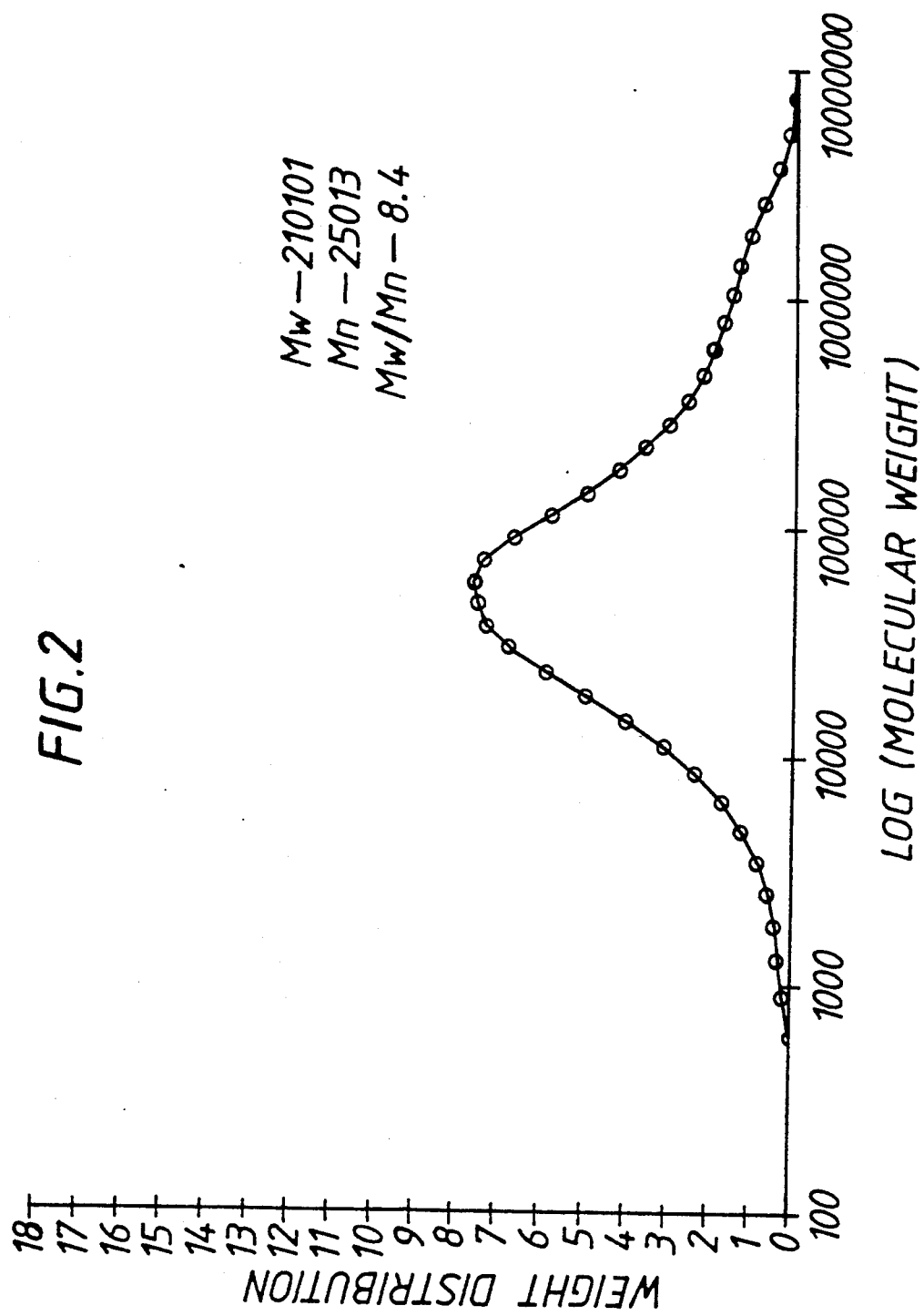

FIGS. 1 and 2 are graphical representations of molecular weight distribution vs. log (molecular weight) of polymers produced with catalysts according to the present invention and as described in Examples 2 and 5 hereinafter.

METHOD FOR MEASURING THE MOLECULAR WEIGHT DISTRIBUTION

The molecular weight distribution of a (co)polymer is calculated according to the ratio of the weight-average molecular weight, Mw, to the number-average molecular weight distribution curve obtained by means of a "WATERS" (trademark) model "150 C" gel permeation chromatograph (High Temperature Size Exclusion Chromatograph), the operating conditions being the following:

solvent: 1,2,4-trichlorobenzene;
solvent flow rate: 1.0 ml/minute;
three "SHODEX" (trademark) model "AT 80 MS" columns of 25 cm of length are employed;
temperature: 145° C.;
sample concentration: 0.1% by weight;
injection volume: 500 µl;
universal standardization using monodispersed polystryrene fractions.

The invention is illustrated by the following example and comparative examples. All catalysts were prepared and stored under conditions which excluded air and water.

EXAMPLE 1

Preparation of (pentamethyl cyclopentadienyl) (2-methyl pentadienyl)chromium (II) [$Cr(C_5(CH_3)_5)(C_6H_9)$]

A 2 liter 3-necked flask was fitted with a nitrogen stopcock adaptor and an overhead stirrer. The vessel was then purged with nitrogen and charged with 800 cm³ of dry degassed 40-60 petroleum ether. To this was added pentamethylcyclopentadiene (60 cm³, 60 g, 441 mmol, purchased from Aldrich) followed by butyl lithium (176 cm³, 441 mmol, 2.5 M in hexanes purchased from Aldrich). A reflux condenser connected to the nitrogen supply was then fitted to the third neck of the flask. The vessel was then placed in a silicone oil bath and the reaction refluxed for 5 h during which time a white precipitate of pentamethyl cyclopentadienyl lithium [$L_i C_5(CH_3)_5$] formed. The solid was then left to settle and the supernatant liquor decanted off using a siphon technique. The product was then washed with 3×500 cm³ 40-60 petroleum ether. Yield=58 g, 93%. The material was highly air sensitive, and pyrophoric, and was stored under nitrogen.

A 1 liter 3-necked flask purged with nitrogen was charged with $CrCl_2$ (9.9 g, 80 mmol, purchased from Aldrich) and a magnetic stirrer bar. A powder addition funnel under an atmosphere of nitrogen was charged with [$Li C_5 (CH_3)_5$] (11.4 g, 80 mmol) and the funnel then connected to the 3-necked flask, the whole operation carried out under nitrogen. Freshly distilled tetrahydrofuran (THF) (250 cm³) was then added to the liter flask and the $CrCl_2$ stirred to break up the solid mass into a slurry. The slurry was then cooled to −40° to −50° C. (monitored by a thermometer in the reaction mixture) using a dry ice isopropanol bath. [Li C$_5$(CH$_3$)$_5$] was then added slowly over 30 minutes to the tetrahydrofuran slurry. The slurry turned from light green through blue to purple at the end of the addition. The reaction mixture was then allowed to warm slowly to room temperature over 1.5 hours; over which time the reaction mixture turned from a purple slurry to a purple black solution.

A 3-necked 250 cm$^3$ flask purged with nitrogen was charged with THF (130 cm$^3$) followed by 2-methyl-1, 4-pentadiene (15.7 cm$^3$, 10.9 g, 133 mmol). The solution was then cooled to 0° C. and butyl lithium (53.6 cm$^3$ 133 mmol, 2.5M in hexanes, ex Aldrich) was added via a syringe. This was stirred for 30 minutes at 0° C. during which time the colour changed from yellow to orange.

The orange solution of 2-methyl pentadienyl lithium [Li C$_6$H$_9$] was then transferred to a powder addition funnel, under an atmosphere of nitrogen connected to a reaction vessel containing the [Li C$_5$(CH$_3$)$_5$ [CrCl$_2$] reaction product (133 mmol based on CrCl$_2$) in THF solution prepared as described above. The THF solution of the chromium pentamethylcyclopentadienyl complex was then cooled to −30° to −40° C. The [Li C$_6$H$_9$] solution was then introduced into the reaction vessel and became dark brown. The solution was then allowed to warm up to 10° C. at which temperature the solvent was removed under vacuum until a dry residue was obtained.

The residue from the above reaction was extracted with 2×200 cm$^3$ followed by 2×50 cm$^3$ of 40-60 petroleum ether and the extracts filtered through a number 3 sintered glass disc. The volume of filtered extracts was then reduced to 80 cm$^3$. The concentrated solution was then allowed to crystallise at −20° C. for 2 h. A dark brown crystalline material was isolated 19.4 g, 54% yield of (pentamethyl cyclopentadienyl)(2-methyl pentadienyl) chromium (II) [Cr(C$_5$(CH$_3$)$_5$(C$_6$H$_9$)].

Catalyst Preparation

A commercially available silica sold by Joseph Crosfield and Sons Ltd under the trade designation EP10 was dehydrated at 150° C. in a vacuum oven. The silica was then heated at a temperature of 800° C. for 24 hours in an oven through which was passed a stream of dry nitrogen. The silica has a surface area of about 280 m$^2$/g. 10 g of the heat treated silica was placed in a 3-necked round bottomed flask, still under an atmosphere of dry nitrogen. 1 g of the complex [Cr(C$_5$(CH$_3$)$_5$)(C$_6$H$_9$)] was dissolved in 40 cm$^3$ of 40-60 petroleum ether. The solution was introduced into the three-necked flask using a syringe. The slurry was stirred and the solvent removed under vacuum to produce free flowing particles. The catalyst contained approximately 2% by weight of chromium.

Polymerization of Ethylene

Ethylene was homopolymerized in a 2.3 liter stainless steel reactor by contacting the monomer with the catalyst in 1.0 liter of isobutane at 90° C. under a total pressure of 4.1 MPa for approximately one hour. The hydrogen pressure used was about 0.1 MPa. The weight of catalyst used is specified in the Table 1. Properties of the polymer are given in the Table 1.

EXAMPLE 2

An ethylene polymerization was carried out using the catalyst described in Example 1 but varying the polymerization conditions as shown in the Table 1. The molecular weight distribution curve for the polymer produces is shown in FIG. 1. The polymer has a broad molecular weight distribution (Mw/Mn=10.1), which is slightly asymmetric.

EXAMPLE 3

This is a repeat polymerization of that carried out in Example 2 using the same catalyst. The reduced productivity of the polymer is due to the presence of some poison traces in the polymerization medium. The molecular weight distribution (Mw/Mn=8.2) and the productivity are both lower than for Example 2.

EXAMPLE 4

Preparation of (pentamethylcyclopentadienyl) (2,4-dimethyl pentadienyl) chromium (II) [Cr(C$_5$(CH$_3$)$_5$)(C$_7$H$_{11}$)]

The preparation of this compound was substantially the same as that described in Example 1 for [Cr(C$_5$(CH$_3$)$_5$)(C$_6$H$_9$)] except that 2, 4-dimethylpentadienyl potassium was used instead of 2-methyl pentadienyl lithium (as reported in H. Yashda, Y, Ohnuma, M. Yamauchi, H. Tani, and A. Nakamura, Bulletin Chem. Soc. Japan, 1979, 52, 2036).

Catalyst Preparation

The catalyst was prepared as described in Example 1 except that the mononuclear chromium complex was 1.1 g of [Cr(C$_5$(CH$_3$)$_5$)(C$_7$H$_{11}$)] impregnated onto 10 g of the heat treated silica to give a 2 wt% chromium loading.

Ethylene Polymerization

Using the catalyst system described above and using the conditions specified in the Table 1, ethylene was polymerized.

EXAMPLE 5

For this example the polymerization was carried out using the catalyst described in Example 4 but at a temperature of 100° C. instead of 90° C. The molecular weight distribution curve for the polymer produced is shown in FIG. 2. The molecular weight distributin has a high molecular weight tail.

EXAMPLE 6

Preparation of (pentamethylcyclopentadienyl) (cyclopentadienyl)chromium (II) [Cr(C$_5$(CH$_3$)$_5$)(C$_5$H$_5$)]

The preparation was substantially the same as that described in Example 1 for [Cr(C$_5$(CH$_3$)$_5$)(C$_6$H$_9$)] except that cyclopentadienyl sodium was used in place of 2-methyl pentadienyl lithium. (Cyclopentadienyl lithium could also have been used). The crystalline product isolated from this preparation was purified by sublimation. Excess [Cr(C$_5$H$_5$)$_2$] was removed by sublimation at 40° C. and about 1 Pa. [Cr(C$_5$(CH$_3$)$_5$)(C$_5$H$_5$)] was then sublimed at 70° C. and about 1 Pa.

Catalyst Preparation

The catalyst was prepared as described in Example 1 except that the mononuclear chromium complex was 1 g of [Cr(C$_5$(CH$_3$)$_5$)(C$_5$H$_5$)] impregnated onto 10 g of the heat treated silica to give an approximate 2 wt% chromium loading.

Ethylene Polymerization

Details of the polymerization conditions are given in the Table 1. The polymer produced has a melt index ratio of 77 indicative of a relatively broad molecular weight distribution.

EXAMPLE 7

Preparation of a chromium pentamethylcyclopentadienyl allyl chromium complex and the supported catalyst The compound [CrCl$_3$. 3THF] (6.6 g 17.5 mmol) was added to pentamethylcyclopentadienyl potassium (19.2 mmol, 10% excess) in a tetrahydrofuran slurry. The mixture was left stirring for 3 h at room temperature after which the solvent was removed. The residue was then extracted with toluene. Removal of the toluene solvent left the turquoise complex [CrCl$_2$ (C$_5$(CH$_3$)$_5$)] (10.5 g, 11% yield).

The complex [CrCl$_2$(C$_5$(CH$_3$)$_5$)] (0.5 g, 1.9 mmol) was suspended in diethyl ether (100 cm$^3$) and allyl magnesium chloride (0.25, 4.3 mmol, 10% excess, in diethylether) added dropwise to the slurry stirred at $-78°$ C. The mixture was then allowed to warm up to room temperature during 1 h to give a red brown solution. The solvent was removed under vacuum and the residue dissolved in 40-60 petroleum ether solvent. The liquid was then filtered and poured directly onto EP10 silica to prepare a catalyst with an approximate 2 wt% chromium loading based on the [CrCl$_2$(C$_5$(CH$_3$)$_5$)] used initially. As in Example 1, the silica used has been heated at 800° C.

Ethylene Polymerization

The details of the polymerization are given in the Table 1. The polymer produced was of high molecular weight with MI$_{21.6}$=3.5 and has a broad molecular weight distribution denoted by Mw/Mn of 13.7.

EXAMPLE 8

Thermal Activation of silica supported [Cr(C$_5$(CH$_3$)$_5$(C$_6$H$_9$)]

4 g of the catalyst described in Example 1 were charged into a nitrogen purged glass activator tube (3 cm diameter) fitted with a sintered glass disc. The catalyst was then fluidised by passing nitrogen through the disc and through the bed of catalyst. This was subjected to a temperature program of 0° to 200° C. over 1 hr followed by a hold period of 20 minutes at 200° C. after which time the catalyst charge was cooled to room temperature.

Ethylene Polymerization

The polymerization was carried out under the same conditions as for Example 1, and it was observed that polymer of lower molecular weight and a broad molecular weight distribution with Mw/Mn=8.9 was produced compared to that of Example 1.

EXAMPLE 9

Using the thermally activated catalyst produced in Example 8 a polymerization was carried out at a higher hydrogen concentration. The polymer produced had a lower molecular weight than that produced in Example 8 but had the same Mw/Mn of 8.9.

COMPARATIVE EXAMPLE A

Example 1 was repeated except that the precursor complex deposited on the silica was bis (pentamethylcyclopentadienyl) chromium (II). The catalyst contained approximately 2 wt% of chromium. On testing in ethylene polymerization using the conditions in the Table 1 only a trace of polymer was produced.

COMPARATIVE EXAMPLE B

Example 1 was repeated except that the catalyst deposited on the silica support was bis (cyclopentadienyl)-chromium (II). The catalyst contained approximately 2 wt% chromium.

COMPARATIVE EXAMPLE C

A commercially available Phillips catalyst EP20 (activated at 815° C. in dry air) (supplied by Joseph Crosfield) was tested in ethylene polymerization under the conditins shown in the Table 1. The polymer produced had a melt index MI$_{2.16}$ of 0.1, and a molecular weight distribution Mw/Mn of 6.7.

Comparative Example B shows that polymer produced over silica supported bis (cyclopentadienyl) chromium (II) is of low molecular weight and narrow molecular weight distribution compared to the polymer produced over catalysts described in this invention under similar conditions.

Comparative Example C shows the type of polymer typically produced over a commercially available Phillips catalyst. From the examples given for catalysts according to the invention it can be seen that polymers with a range of molecular weights and molecular weight distributions may be achieved with some of the distributions being broad relative to the polymer produced over the Phillips catalyst. Examples 1 and 2 and Examples 8 and 9 show the very specific effect of hydrogen concentration on the molecular weight and the molecular weight distribution of the polymer produced. A decrease of the molecular weight of the polymer obtained by an increased hydrogen concentration keeps constant the value of Mw/Mn with an activated catalyst (Examples 8 and 9), or even leads to an increase of the value of Mw/Mn with a non-activated catalyst (Examples 1 and 2).

EXAMPLE 10

Thermal Activation of silica supported [Cr(C$_5$(CH$_3$)$_5$(C$_6$H$_9$)]

Example 8 was repeated except that the catalyst was thermally activated at 250° C. instead of 200° C.

Ethylene Polymerization

Ethylene was homopolymerized in a 2.3 liter stainless steel reactor by contacting the monomer with the catalyst in 1.0 liter of isobutane at 90° C. under a total pressure of 3.6 MPa for 100 minutes. The hydrogen pressure used was about 0.3 MPa. The weight of catalyst used is specified in the Table 2. Properties of the polymer are given in the Table 2.

EXAMPLE 11

Ethylene/hexene-1 Copolymerization

Ethylene was copolymerized with 10 ml of hexene-1 in a 2.3 liter stainless steel reactor by contacting the two comonomers with the catalyst prepared in Example 10, in 1.0 liter of isobutane at 90° C. under a total pressure of 3.6 MPa for 60 minutes. The hydrogen pressure used was about 0.3 MPa. The weight of catalyst used is specified in the Table 2. Properties of the copolymer are given in the Table 2.

EXAMPLE 12

Ethylene/hexene-1 Copolymerization

An ethylene/hexene-1 copolymerization was carried out in the same conditions as in Example 11, except that 40 ml of hexene-1 were used instead of 10 ml. The weight of catalyst used is specified in the Table 2. Properties of the copolymer are given in the Table 2.

TABLE 1

| Example No. | Polymerization | | | | | | | Polymer | | | | | | |
|---|---|---|---|---|---|---|---|---|---|---|---|---|---|---|
| | Cat. g | $H_2$ MPa | T P MPa | T °C. | Time Mins | Prod. g/g | Act. g/gh | $MI^a$ 2.16 | $MI^b$ 21.6 | $MIR^c$ | Density (kg/m3) | G.P.C. | | |
| | | | | | | | | | | | | Mw | Mn | Mw/Mn |
| 1 | 0.15 | 0.1 | 4.1 | 90 | 60 | 3068 | 3068 | — | 0.7 | — | 950 | 288,000 | 53,200 | 5.4 |
| 2 | 0.08 | 0.2 | 3.5 | 90 | 60 | 3825 | 3825 | 0.09 | 8.5 | 94 | 956 | 242,000 | 24,000 | 10.1 |
| 3 | 0.08 | 0.2 | 3.5 | 90 | 60 | 3154 | 3154 | 0.10 | 8.4 | 84 | 955 | 222,000 | 27,200 | 8.2 |
| 4 | 0.12 | 0.1 | 4.1 | 90 | 60 | 3932 | 3932 | — | 1.1 | — | 950 | 289,000 | 25,400 | 11.4 |
| 5 | 0.16 | 0.1 | 4.1 | 100 | 60 | 1761 | 1761 | 0.16 | 16.4 | 103 | 957 | 210,000 | 25,000 | 8.4 |
| 6 | 0.24 | 0.1 | 4.1 | 90 | 60 | 1283 | 1283 | 0.86 | 65.8 | 77 | 958 | — | — | — |
| 7 | 0.46 | 0.1 | 4.1 | 90 | 60 | 875 | 875 | — | 3.5 | — | 955 | 404,000 | 29,500 | 13.7 |
| 8 | 0.15 | 0.1 | 4.1 | 90 | 60 | 2423 | 2423 | 0.22 | 14.6 | 66 | 960 | 176,000 | 19,800 | 8.9 |
| 9 | 0.14 | 0.3 | 4.1 | 90 | 60 | 2364 | 2364 | 3.1 | 196 | 64 | 966 | 89,600 | 10,000 | 8.9 |
| A | 0.54 | 0.1 | 4.1 | 90 | 60 | 0 | 0 | — | — | — | — | — | — | — |
| B | 0.06 | 0.1 | 4.1 | 90 | 75 | 2947 | 2358 | 60.0 | 1890 | 32 | 966 | 40,100 | 9,850 | 4.1 |
| C | 0.09 | — | 4.1 | 100 | 60 | 5478 | 5478 | 0.1 | 9.5 | 95 | 957 | 178,000 | 26,500 | 6.7 |

T.P. = Total Pressure
$^a$Melt index according to ASTM D 1238 Condition E
$^b$High load melt index according to ASTM D 1238 Condition F
$^c$Melt index ratio = $\frac{\text{Melt Index according to ASTM D 1238 (Condition F)}}{\text{Melt Index according to ASTM D 1238 (Condition E)}}$

TABLE 2

| Example No. | Polymerization | | | | | | | Polymer | | | | | | |
|---|---|---|---|---|---|---|---|---|---|---|---|---|---|---|
| | Cat. g | $H_2$ MPa | T P MPa | T °C. | Time Mins | Prod. g/g | Act. g/gh | $MI^a$ 2.16 | $MI^b$ 21.6 | $MIR^c$ | Density (kg/m3) | G.P.C. | | |
| | | | | | | | | | | | | Mw | Mn | Mw/Mn |
| 10 | 0.25 | 0.3 | 3.6 | 90 | 100 | 1113 | 668 | 0.1 | 12.0 | 120 | 961 | 218,000 | 13,600 | 16.1 |
| 11 | 0.34 | 0.3 | 3.6 | 90 | 60 | 923 | 923 | 0.1 | 13.2 | 132 | 958 | 243,000 | 14,400 | 16.8 |
| 12 | 0.35 | 0.3 | 3.6 | 90 | 60 | 759 | 759 | 0.08 | 13.0 | 163 | 957 | 274,000 | 16,200 | 17.0 |

T.P. = Total Pressure
$^a$Melt index according to ASTM D 1238 Condition E
$^b$High load melt index according to ASTM D 1238 Condition F
$^c$Melt index ratio = $\frac{\text{Melt Index according to ASTM D 1238 (Condition F)}}{\text{Melt Index according to ASTM D 1238 (Condition E)}}$

I claim:

1. An olefin polymerization catalyst obtainable by depositing on a dry inorganic oxide support at least one mononuclear chromium complex characterised in that the mononuclear chromium complex is representable by the general formula:

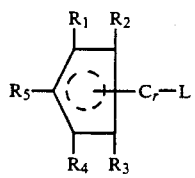

wherein
four of the groups $R_1$ to $R_5$ of the substituted cyclopentadienyl ligand are individually selected from the group consisting of methyl, ethyl, isopropyl and n-propyl and the fifth is selected from the group consisting of methyl, ethyl, n-propyl, isopropyl and hydrogen and L is one or more hydrocarbyl ligands (depending on the coordination sites available on the chromium) which ligands are sufficiently reactive to enable the complex to react with the inorganic oxide without thermal activation.

2. A catalyst as claimed in claim 1 in which the reactive hydrocarbyl ligands are selected from the group consisting of:
   (a) cyclopentadienyl,
   (b) cyclopentadienyl substituted with one or two groups individually selected from methyl, ethyl, isopropyl and n-propyl,
   (c) pentadienyl
   (d) pentadienyl substituted with a hydrocarbyl group containing 1 to 6 carbon atoms
   (e) allyl and
   (f) allyl substituted with a hydrocarbyl group containing 1 to 6 carbon atoms.

3. A catalyst as claimed in claim 2 in which the reactive hydrocarbyl is selected from substituted pentadienyl and substituted allyl either of which is substituted with up to three groups individually selected from methyl, ethyl, isopropyl and n-propyl.

4. A catalyst as claimed in claim 2 in which the reactive hydrocarbyl ligand L is selected from the group consisting of cyclopentadienyl, allyl, 2,4-dimethyl-pentadienyl, 2-methyl-pentadienyl and pentadienyl.

5. A catalyst as claimed in claim 1, 2, 3 or 4 in which the inorganic oxide comprises a major amount of silica.

6. A catalyst as claimed in claim 1, 2, 3 or 4 in which the amount of chromium deposited on the inorganic oxide is from 0.01 to 10% by weight of the total weight of the complex and inorganic oxide.

7. A catalyst as claimed in claim 1, 2, 3 or 4 which has been thermally activated by heating at a temperature of 100° to 350° C., in a dry, inert atmosphere.

8. A catalyst as claimed in claim 3 in which the inorganic oxide comprises a major amount of silica and the amount of chromium deposited on the inorganic oxide is from 0.01 to 10% by weight of the total weight of the complex and inorganic oxide.

9. A catalyst as defined in claim 8 which has been thermally activated by heating at a temperature of 100° to 350° C., in a dry, inert atmosphere.

10. A catalyst as defined in claim 1, wherein each of $R_1$ through $R_5$ is methyl and L is 2,4-dimethyl pentadienyl.

11. A catalyst as defined in claim 1, wherein each of $R_1$ through $R_5$ is methyl and L is cyclopentadienyl.

12. A catalyst as defined in claim 1, wherein each of $R_1$ through $R_5$ is methyl and L is allyl.

* * * * *

UNITED STATES PATENT AND TRADEMARK OFFICE
CERTIFICATE OF CORRECTION

PATENT NO.  : 5,169,817
DATED       : December 8, 1992
INVENTOR(S) : GORDON M. DAWKINS It is certified that error appears in the above-identified patent and that said Letters Patent is hereby corrected as shown below:

Col. 3, line 26, there should be a comma (,) after the word "methyl,"

Col. 8, l. 49, correct the spelling of the word "distribution"

Col. 10, l. 22, correct the spelling of the word "conditions"

Signed and Sealed this

Sixteenth Day of November, 1993

BRUCE LEHMAN

Attest:

Attesting Officer

Commissioner of Patents and Trademarks